Figure 1:
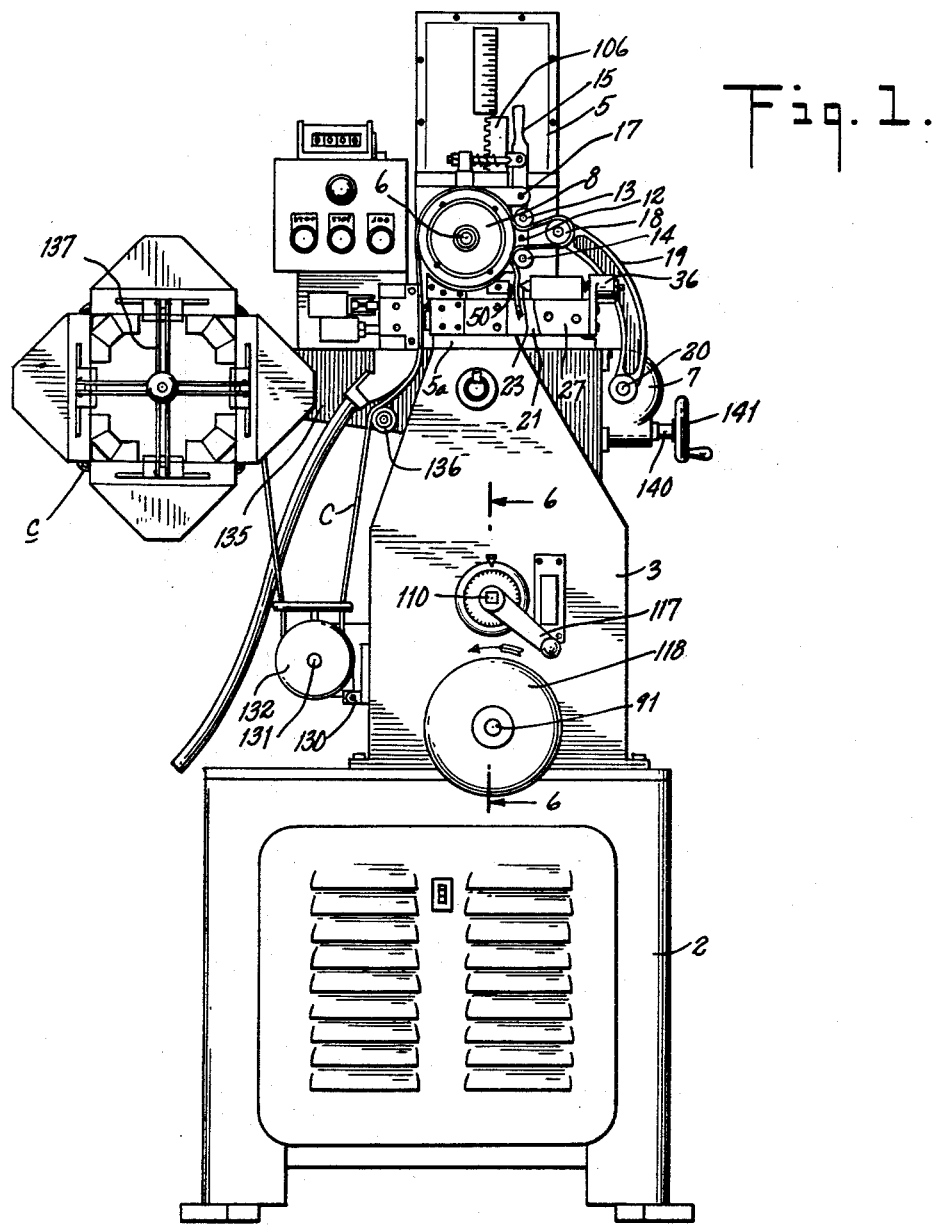

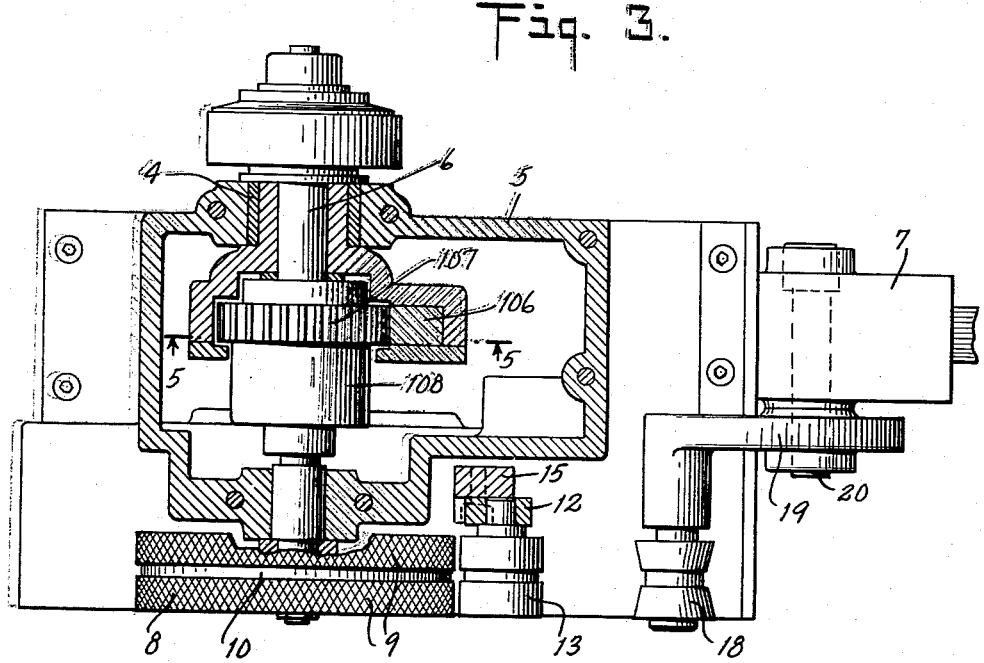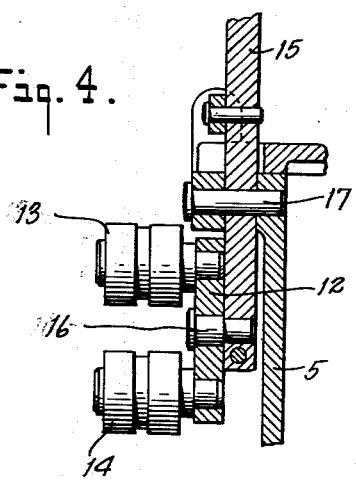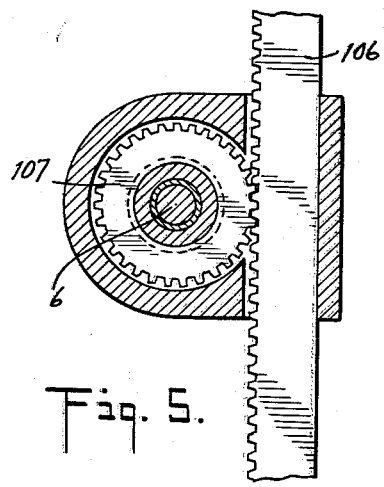

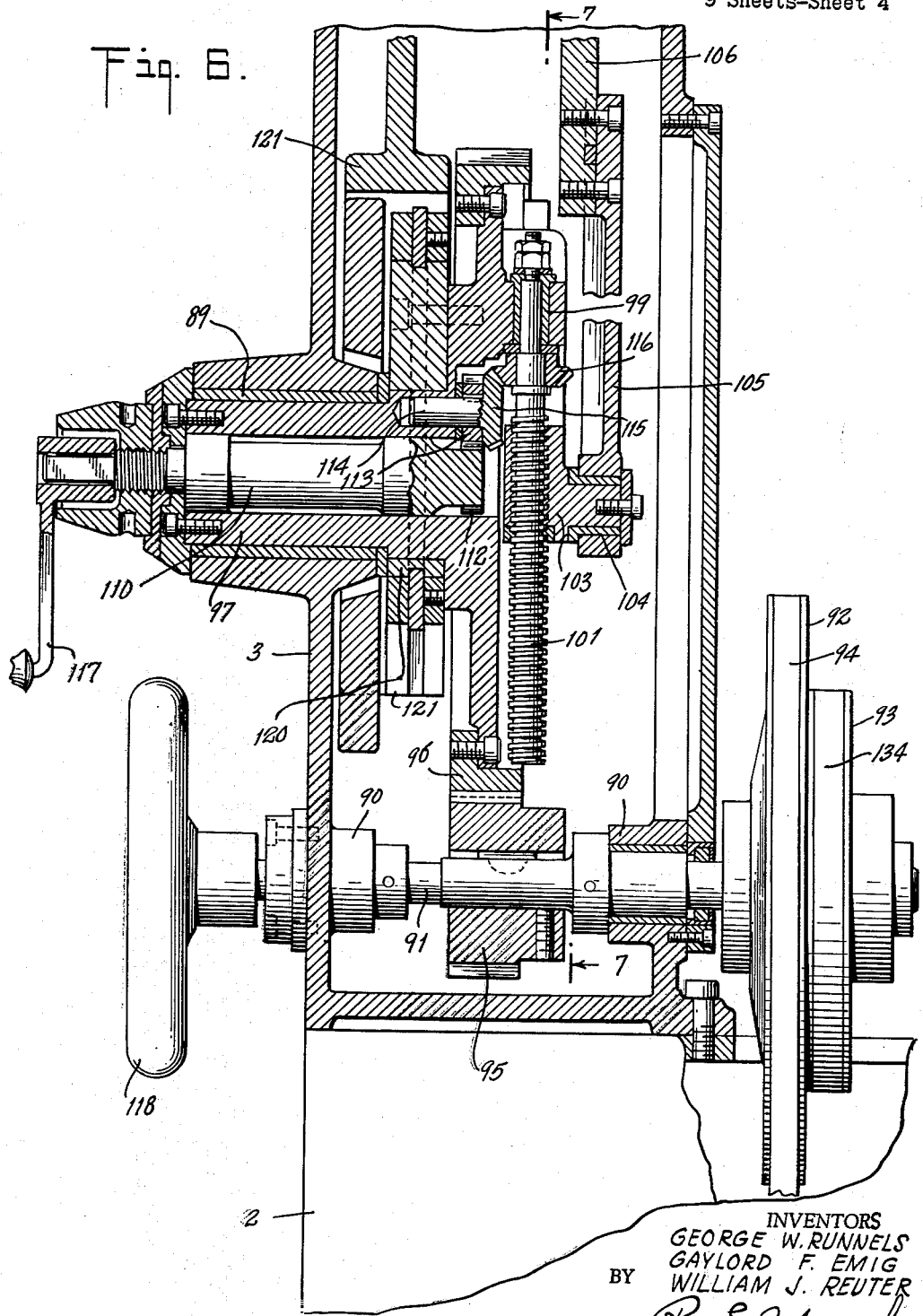

June 22, 1965
G. W. RUNNELS ETAL
3,190,161
MACHINE FOR CUTTING SLIDE FASTENER CHAIN
Filed July 5, 1961
9 Sheets-Sheet 5
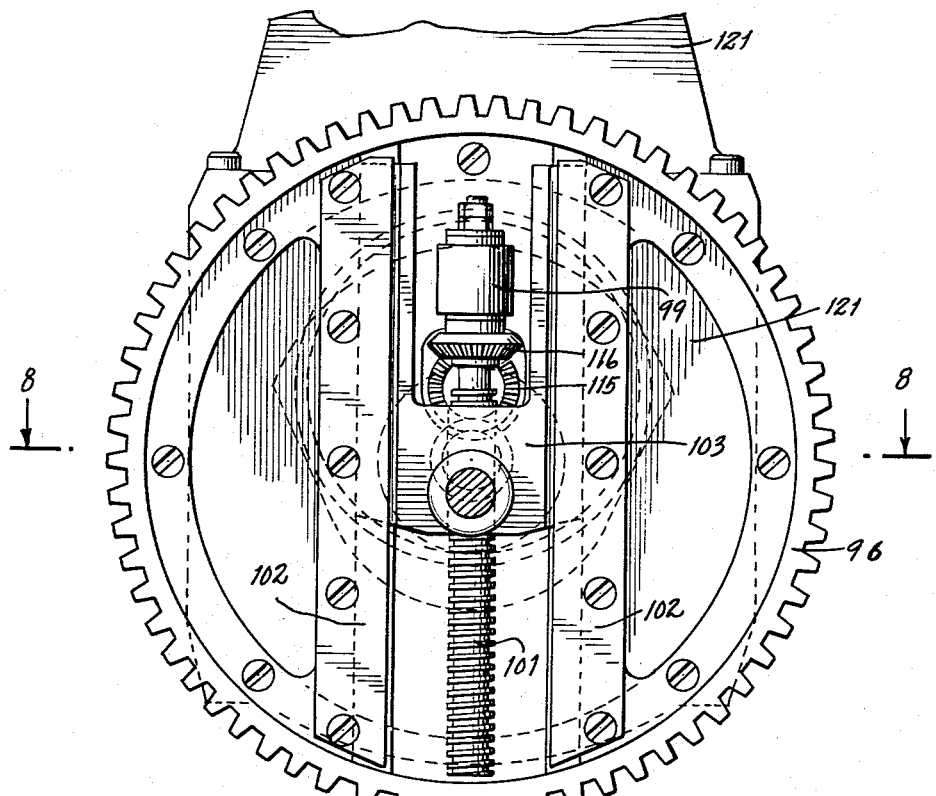
INVENTORS
GEORGE W. RUNNELS
GAYLORD F. EMIG
WILLIAM J. REUTER
BY 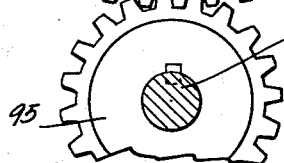
ATTORNEY

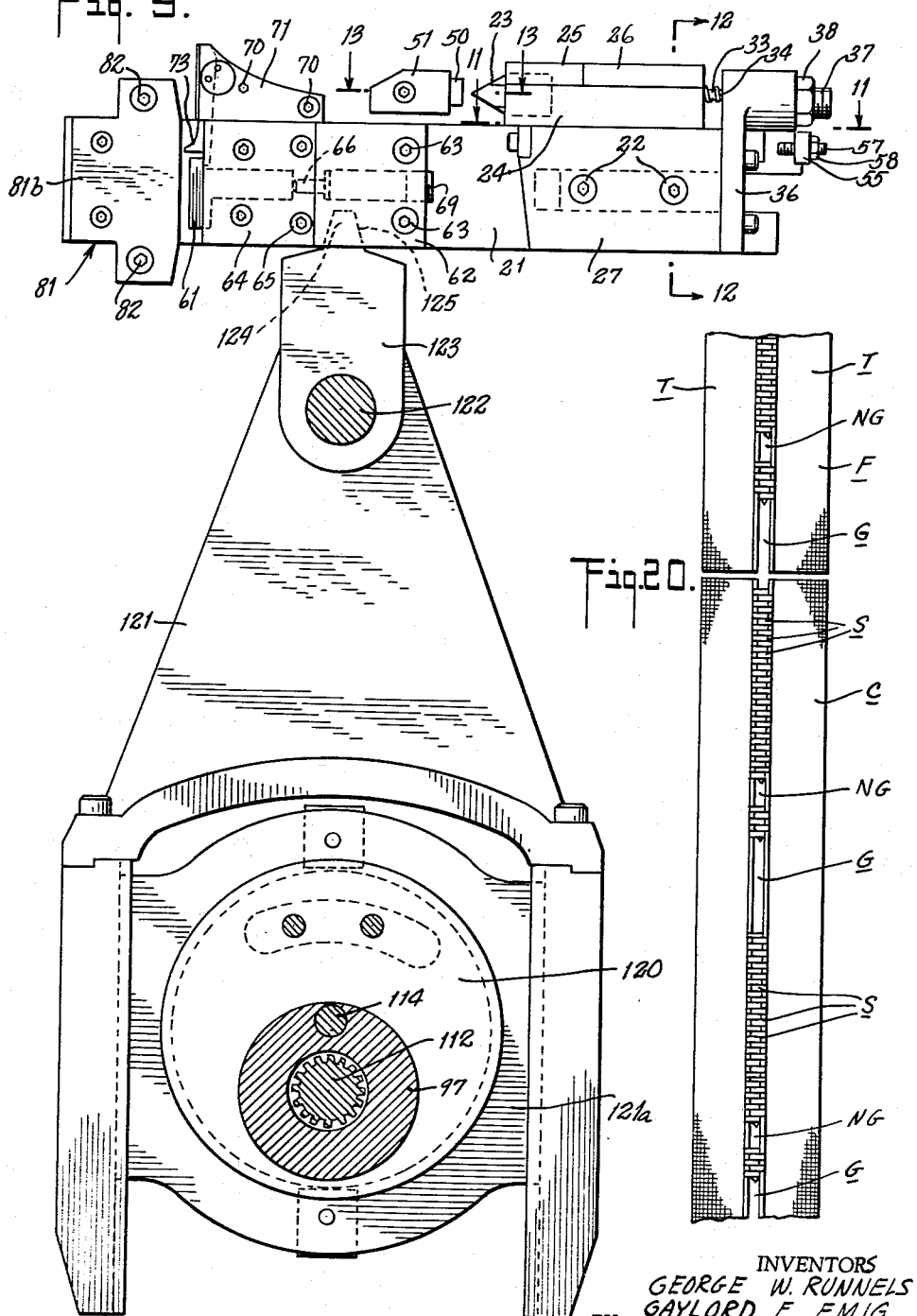

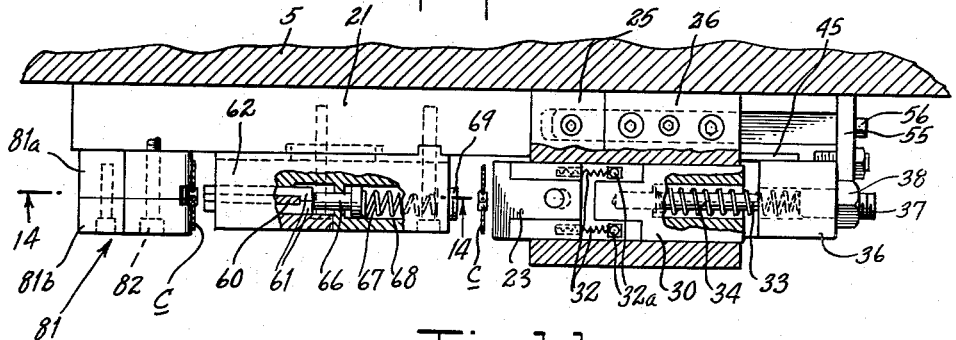
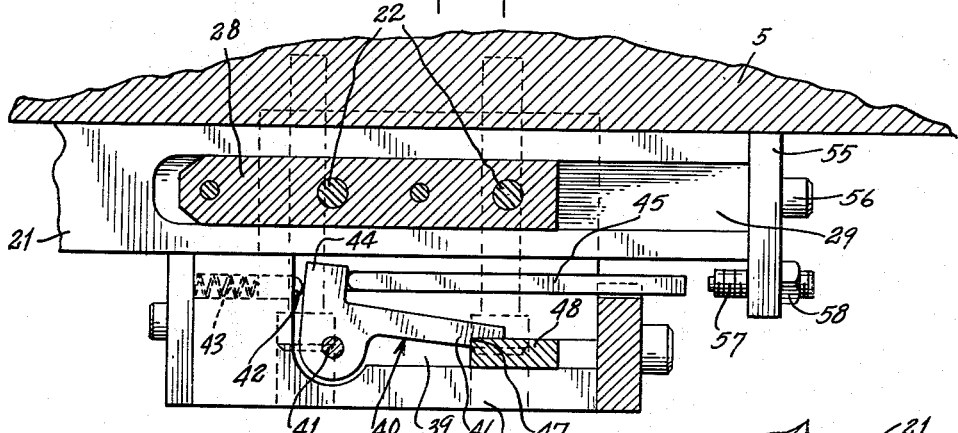
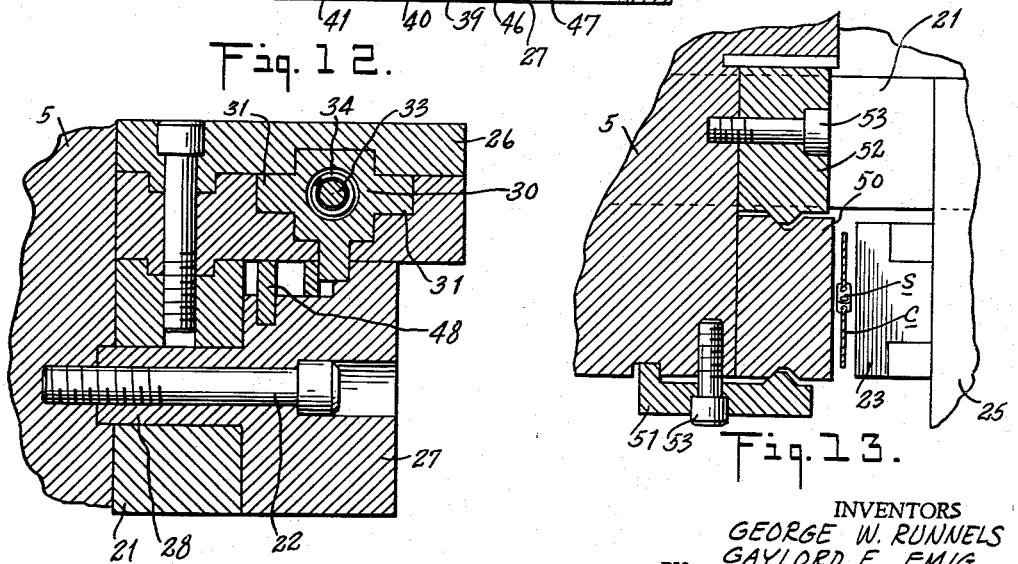

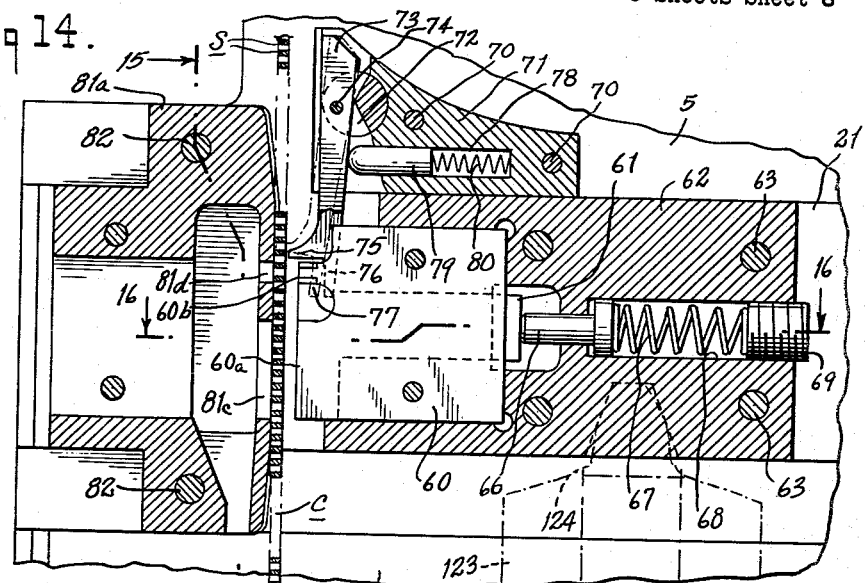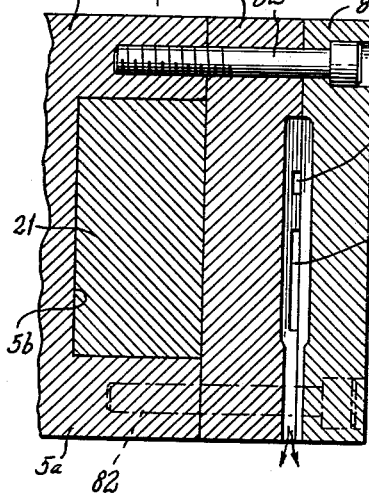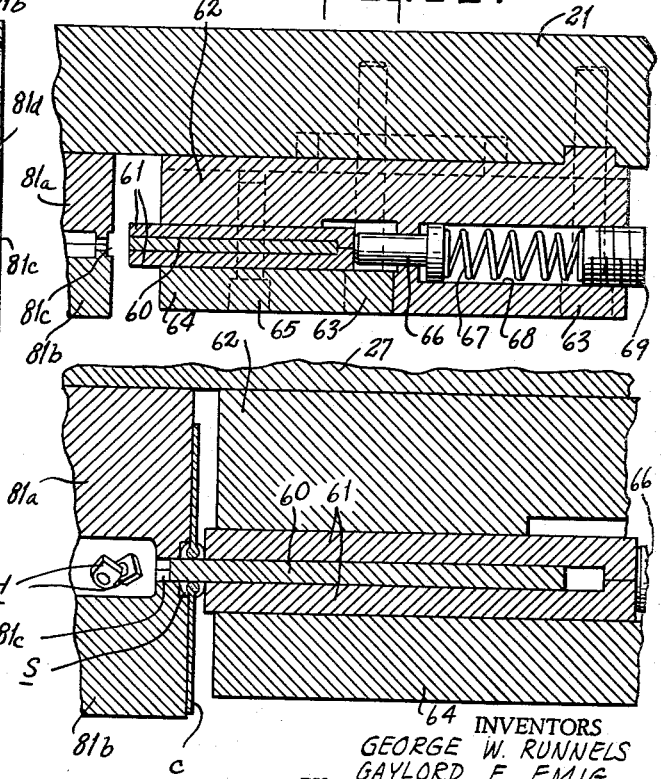

June 22, 1965  G. W. RUNNELS ETAL  3,190,161
MACHINE FOR CUTTING SLIDE FASTENER CHAIN
Filed July 5, 1961  9 Sheets-Sheet 9
Fig. 18.
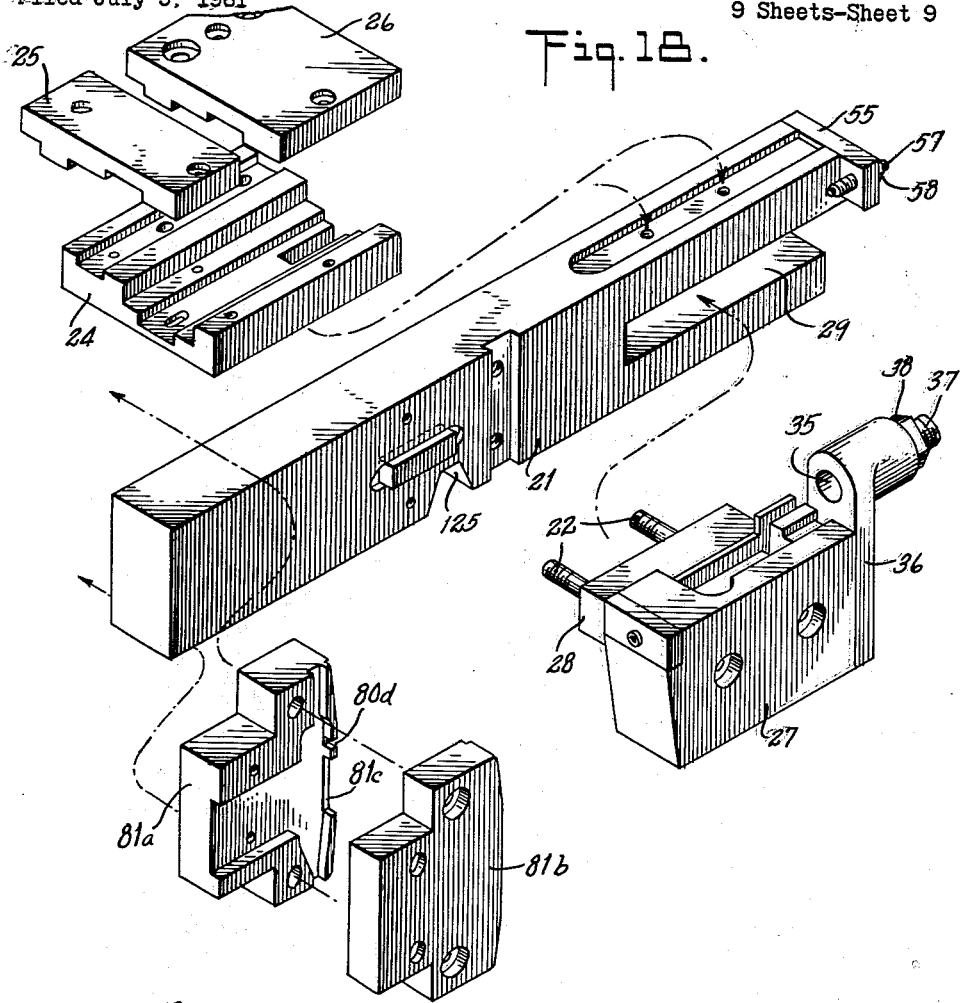
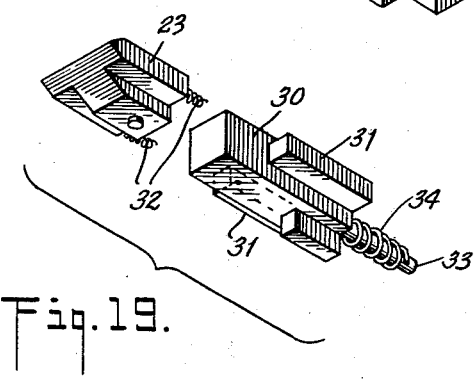
Fig. 19.
INVENTORS
GEORGE W. RUNNELS
BY GAYLORD F. EMIG
WILLIAM J. REUTER
R. E. Meech
ATTORNEY

United States Patent Office 3,190,161
Patented June 22, 1965

3,190,161
MACHINE FOR CUTTING SLIDE FASTENER CHAIN
George W. Runnels, Gaylord F. Emig, and William J. Reuter, Meadville, Pa., assignors to Talon, Inc., a corporation of Pennsylvania
Filed July 5, 1961, Ser. No. 121,894
18 Claims. (Cl. 83—256)

This invention relates to slide fasteners, and more particularly to a machine for cutting automatically from so-called continuous slide fastener chain individual slide fasteners of predetermined length.

In the manufacture of slide fasteners, it is sometimes desirable to provide mainly for economical reasons so-called continuous slide fastener chain which is produced on a so-called chain or attaching machine and afterwards to cut the chain at spaced-apart intervals into individual slide fastener lengths. Such continuous chain consists generally of a pair of continuous length tapes having a series of spaced-apart interlocked fastener elements or scoops clamped or otherwise attached to the opposed edges thereof continuously therealong. In producing individual fasteners from such chain, it is usually customary to provide so-called gap spaces at intervals along the chain not only for the purpose to designate fastener lengths but to provide a space free from fastener elements for cutting the tapes transversely thereof and so as to provide so-called tape ends at both the top and the bottom of the individual cut slide fastener lengths for a purpose well known to those skilled in the art.

In certain applications of slide fasteners, such as in trousers, skirt plackets and the like, it is customary to bury or conceal the ends of the fastener stringers of the fastener, usually the top ends thereof, in the waistband or other fold of the garment. In such cases tape ends are usually desirable and it is customary in such applications in the trade to sew directly through and across the upper portion of the fastener and across the fastener elements located on the stringer tapes at this point. It will be readily seen that if fastener elements are positioned in the path of the needle, that needle breakage would frequently occur due to the fact that the needle would strike the metallic fastener elements as it passes therealong in the sewing operation which, of course, is objectionable. In order to eliminate this objection and to overcome the danger of such needle breakage, it will be obvious that the fastener elements should be removed from the edges of the stringer tapes at this point so as to provide a so-called needle gap and the machine of the present invention is designed to provide such gap in the fastener chain simultaneously with the providing of the gap space previously described.

Accordingly, it is the general object of the present invention to provide an improved machine for cutting and removing a group of adjacent slide fastener elements from continuous slide fastener chain at spaced apart intervals therealong so as to provide predetermined spaced-apart gap and needle gap spaces along the chain, and to cut synchronously from the continuous chain at the first gap spaces individual slide fastener lengths.

It is another object of the invention to provide such a machine having means incorporated therewith whereby the desired distance between the gap spaces for the desired length fastener to be cut from the chain and the length of the fastener to be cut therefrom can be easily and quickly adjusted.

It is a further object of this invention to provide such a cutting machine having locating means incorporated therewith which will insure that the fastener elements of the chain are positioned and located correctly in respect to the gap cutting means so that full fastener elements will be cut from the edges of the stringer tapes of the chain and not partially cut so as to avoid any portion of the elements from being hung up on the edges of stringer tapes, which is objectionable.

It is still another object of the present invention to provide a slide fastener chain cutting machine having a common means incorporated therewith for actuating the fastener element severing and removing means for forming the gap spaces in the chain and the means for cutting individual slide fastener lengths therefrom.

It is a more specific object of the invention to provide such a machine wherein there is provided a relatively large rotatable feed wheel for pulling or drawing the continuous fastener chain from its source of supply into and through the machine having a slide member arranged to one side thereof for reciprocable movement in a plane normal to the axis of rotation of the feed wheel with the slide member adjacent one end thereof having means arranged therewith and actuated thereby for forming the gap spaces in the chain and cutting means arranged adjacent the opposite end for cutting synchronously individual slide fastener lengths from the chain.

It is another object of this invention to provide an improved machine for cutting continuous chain which efficiently and effectively removes the fastener elements therefrom to form the desired gap spaces therealong and, at the same time, dispenses simultaneously therefrom measured slide fastener lengths ready to be completed into finished slide fasteners.

Various other objects and advantages of this invention will be more apparent in the course of the following specification, and will be particulary pointed out in the appended claims.

In the accompanying drawings, there is shown for the purpose of illustration, an embodiment which our invention may assume in practice.

Figure 2:
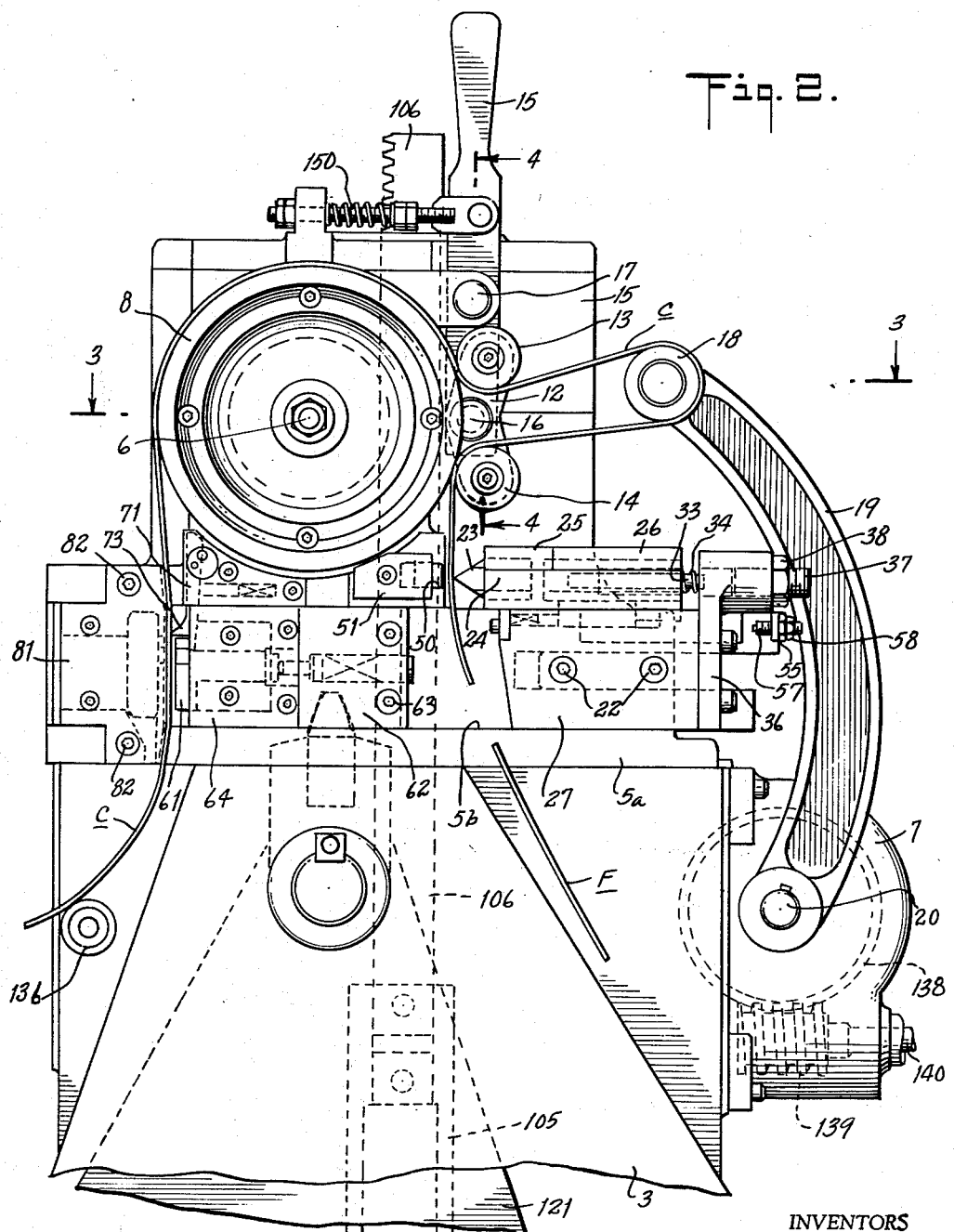

In these drawings:

FIG. 1 is a front elevational view of the improved slide fastener chain cutting machine of our invention, FIG. 2 is an enlarged front elevational view of the upper portion of the machine as shown in FIG. 1, FIG. 3 is a sectional view taken on line 3—3 of FIG. 2, FIG. 4 is a sectional view taken on line 4—4 of FIG. 2, FIG. 5 is a sectional view taken on line 5—5 of FIG. 3, FIG. 6 is an enlarged sectional view taken on line 6—6 of FIG. 1, FIG. 7 is a sectional view taken on line 7—7 of FIG. 6, FIG. 8 is a sectional view taken on line 8—8 of FIG. 7, FIG. 9 is a sectional view taken on line 9—9 of FIG. 8, FIG. 10 is a top view of the slide member and associated mechanism, partly broken away, FIG. 11 is an enlarged sectional view taken on line 11—11 of FIG. 9, FIG. 12 is an enlarged sectional view taken on line 12—12 of FIG. 9, FIG. 13 is an enlarged sectional view taken on line 13—13 of FIG. 9, FIG. 14 is an enlarged sectional view taken on line 14—14 of FIG. 10, FIG. 15 is a sectional view taken on line 15—15 of FIG. 14, FIG. 16 is a sectional view taken on line 16—16 of FIG. 14, showing the cutting knife in its normal or retracted position, FIG. 17 is an enlarged sectional view similar to FIG. 16, showing the cutting knife in its protracted position, FIG. 18 is an exploded perspective view of the slide member and its associated parts, FIG. 19 is an exploded perspective view of the cut-off knife and its associated parts, and FIG. 20 is a fragmentary view of a length of slide fastener chain showing a fastener cut therefrom.

Referring more particularly to the drawings, the improved machine in accordance with the present invention comprises a base 2 on which there is mounted a housing 3. Above this housing 3, there is arranged in suitable bearings 4 in another housing 5, a transversely extending rotatable shaft 6 having slide fastener chain feed roller or wheel 8 securely attached to one end thereof, as more clearly shown in FIGS. 1, 2 and 3 of the drawings. The periphery of this feed wheel or roller 8 is preferably knurled, as at 9, with a groove 10 arranged centrally and circumferentially therearound.

To one side of this feed wheel 8, there is rotatably mounted on a movable yoke-like arm member 12, a pair of spaced-apart guide rollers 13 and 14. The arm-like member 12 is pivotally attached to the lower end of a lever-like manipulating member 15 by means of a pin 16 and this lever-like manipulating member 15 in turn is pivotally attached to the side of the housing 5 by means of a pin 17, as more clearly shown in FIG. 4.

Beyond this pair of rollers 13 and 14, and to the outer side thereof, there is arranged another roller 18 which is rotatably mounted on the upper free end of a vertically extending arcuated arm 19. The opposite end of this arm 19 is securely fixed to the end of a shaft 20 rotatably mounted in suitable bearings, in a bracket 7 secured to the end of the housing 3.

Cut-off mechanism

On top of the base 5a of the housing 5 and below the rotatable feed wheel 8, there is positioned a transversely extending slide member 21 which is arranged for lateral reciprocation in a slot 5b in the housing base 5a. On one end of this slide member 21, and to the front side thereof, there is arranged a cut-off knife 23 which is supported thereon by a lower plate-like member 24 and a pair of cover plates 25 and 26 secured to the top of the slide member. On the front side of this slide 21, there is arranged a block-like guide member 27 having a spacer block 28 arranged therewith which is secured to the side of the housing 5 by means of screws 22, as more clearly shown in FIGS. 10, 11, 12, 18 and 19 of the drawings. This spacer block is arranged in a slot 29 in the end of the slide 21. The cutting knife 23 is arranged between the plates 24 and 25 and positioned in suitable guide grooves therein. There is arranged between the plates 24 and 26 in suitable guide grooves therein rearwardly of the cutting knife 23, a block-like member or knife slide 30 having a lateral projection 31 on each side thereof, as more clearly shown in FIG. 19 which is movable relative to the slide member 21. Between each of these projections and the outer end of the cutting knife 23 there is arranged a coil spring 32 with one end thereof attached to 32a, as shown in FIG. 19. On the outer end of this block-like member 30, there is arranged a stud-like member 33 around which there is arranged a coil spring 34, both of which are housed in a cylindrical opening 35 in a bracket member 36 secured to the outer end of the block-like guide member 27. In the outer end of this cylindrical opening 35, there is arranged a threaded stud 37 on which there is positioned an adjusting nut 38.

As more clearly shown in FIG. 11, in a recess 39 in the top side of the block-like guide member 27, there is arranged a trigger-like latch member 40 which is pivotally attached thereto by means of pin 41. To one side of this trigger-like member 40 there is arranged in a hole in the block-like guide member 27, a spring plunger 42 which is backed by a coil spring 43 and which cooperates with an arm portion 44 of the trigger-like member 40. On the opposite side of this arm 44 there is arranged a movable elongated latch releasing rod 45. The arm portion 46 of the trigger-like member 40 is notched adjacent the end thereof so as to provide a shoulder 47 which cooperates with a block-like member 48 arranged in the recess 39.

On the outer end of the slide member 21 there is arranged a plate-like member 55 which is secured to the end of the slide by means of a screw 56. There is arranged in a threaded hole in this plate-like member 55, an adjustable stud-like member 57 having a locking nut 58 arranged thereon. The inner end of this stud-like member 57 is positioned directly opposite the outer end of the plunger rod 45 with which it cooperates.

As more clearly shown in FIGS. 1, 9 and 13 of the drawings, there is positioned directly opposite the cutting edge of the cut-off knife 23 and below the feed wheel 8, a stationary cut-off anvil 50 which is mounted between a pair of members 51 and 52 which in turn are secured to the housing 5 by means of screws 53. It will be understood that this cut-off anvil 50 cooperates with the cut-off knife 23 for cutting fastener lengths F from the continuous chain C in a manner hereinafter to be described.

Gap cutting mechanism

Now referring more particularly to FIGS. 2, 9, 10 and 14 through 18 of the drawings, there is arranged at the end of the slide member 21 opposite that from the cut-off knife 23 and its associated mechanism, which has just been described, mechanism for removing fastener elements or scoops S from the chain C so as to provide gap spaces G therealong.

This gap cutting mechanism consists of a cutting knife member 60 arranged between a pair of pressure pads 61 mounted in a block-like member 62 which is affixed to the side of slide member 21 by means of screws 63. This knife member 60 together with the pressure pads 61 are held in position on the block-like member 62 by means of a plate-like member 64 and screws 65. The outer end of this knife member 60 has cutting edges 60a and 60b.

There is also arranged in this block-like member 62 rearwardly of the cutting knife 60 and the pressure pads 61, a plunger 66 having one end thereof abutting the inner ends of the pressure pads 61. The opposite end of this plunger engages a coil spring 67 positioned in cylindrical opening 68. In the end of this opening 68 there is arranged an adjusting screw 69.

Above the block-like member 62 and this end of the slide member 21, and secured to the side of the housing 5 by means of screws 70, is a block-like member 71 in which there is arranged vertically in a slotted opening 72 in the outer side thereof, a latch-like locating member 73 which is pivotally attached to this block-like member 71 by means of a pin 74. The lower end of this locating member 73 is preferably beak-shaped so as to provide an outwardly extending finger 75 on the extreme end thereof. Also, on the lower end of this locating member 73 there is provided an extension 76 which cooperates with upper extensions 77 of the pressure pads 61. In a cylindrical opening 78 in the block-like member 71 rearwardly of the locating member 73 there is arranged a pin 79 which is backed by a coil spring 80.

Directly opposite the cutting knife 60 and this end of the slide member 21 there is arranged a die member 81 consisting of two complementary parts 81a and 81b, as more clearly shown in FIGS. 14, 15 and 18, which are mounted on the side of the housing 5 and are secured thereto by means of screws 82. On the inner face of this die 81 there are arranged two die openings 81c and 81d which cooperate with the respective cutting edges 60a and 60b of the cutting knife 60 for a purpose and in a manner hereinafter to be described. This die member 81 in cooperation with the housing 5 also acts to guide this end of this slide member 21.

Driving mechanism

Attention is now directed more particularly to FIGS. 3, 6, 7 and 8 of the drawings which show more clearly the driving mechanism. This driving mechanism consists of a motor (not shown) mounted and enclosed in the base 2. In suitable bearings 90 in the housing 3, there is arranged a shaft 91 on one end of which there is mounted a pair of pulleys 92 and 93. Around the pulley 92 there is arranged a V-belt 94 which also passes around a pulley (not shown) on the motor (not shown) for driving this shaft 91. Centrally of this shaft 91 there is arranged thereon within the housing 3 a gear 95 which meshes with a bull gear 96 arranged on a shaft extension 97 arranged in a suitable bearing 89 positioned thereabove for driving the same. On the inner side of this gear 96, there is arranged in a bearing 99 carried thereby, a diametrically extending adjusting screw 101 on which there is mounted in suitable guides 102, a nut-like member 103 for movement therealong and which acts as an eccentric. On this nut-like member 103 there is pivotally attached to a bearing 104 carried thereby, a vertically extending arm 105 to which there is securely fixed a vertically extending gear *rack* 106 which cooperates with a gear 107 arranged with an overrunning clutch 108 arranged on the shaft 6 in the upper housing 5, as more clearly shown in FIGS. 3 and 5 of the drawings, for rotating the shaft 6 and the feed wheel 8 attached thereto.

Within the housing 3 and concentric with the shaft extension 97 of the gear 96, there is arranged another shaft 110 having a gear 112 arranged on the inner end thereof which meshes with a gear 113 arranged on a stud shaft 114. There is arranged on the outer end of this stud shaft 114, a beveled gear 115 which meshes with a beveled gear 116 affixed to the adjusting screw 101. On the outer end of the shaft 110 there is arranged a hand crank 117 for manually turning this shaft 110 together with the adjusting screw 101 through the various gear train just described. On the outer end of the shaft 91, there is arranged a hand wheel 118 for manually turning this shaft, if desired.

On the shaft extension 97 of the bull gear 96, there is arranged an eccentric 120 which is encircled by the lower end 121a of a vertically extending yoke-like member 121, with which it cooperates, as more clearly shown in FIGS. 2, 6, 8 and 9 of the drawings. On the upper end of this yoke-like member 121 there is affixed thereto by means of a pin 122, an actuator holder 123 having an upwardly extending actuator 124 in the form of a tooth arranged in top side thereof which meshes or cooperates with a slot 125 arranged in the bottom side of the slide member 21 to actuate the same, as seen in FIGS. 2, 9 and 18. That is to say, this yoke-like member 121 is oscillated by the eccentric 120 so as to reciprocate the slide member 21 when the drive shaft 91 is rotated.

On the fastener feed-in side of the machine, as more clearly shown in FIGS. 1 and 2 of the drawings, there is arranged on a bracket 130 attached to the side of the housing 3, a rotatable shaft 131 having a chain feed roller 132 arranged on one end thereof and a pulley (not shown) arranged on the opposite end. As shown in FIG. 6, there is provided a V-belt 134 which passes around the pulley 93 and the pulley on shaft 131 for driving the same from the drive shaft 91.

Above this feed roller, as more clearly shown in FIG. 1, there is provided an arm extension 135 on which there is rotatably mounted a guide roller 136. On the outer end of this arm extension there is rotatably arranged a reel 137 on which there is mounted a supply of continuous fastener chain C.

In the bracket housing 7 on the fastener delivery side of the machine, there is arranged on the shaft 20, a gear 138 which meshes with a worm gear 139 arranged on the inner end of a shaft 140. On the outer end of this shaft 140 there is arranged a handle 141 for manually rotating the same for adjusting the angular position of the arm 19 together with the roller 18 carried thereby in order that a fastener length is cut from the continuous chain at the proper place in the gap space G.

*Operation*

Having described the construction of the machine of the present invention, it operates in the following manner.

It will be understood that this machine is designed to handle continuous slide fastener chain C which consists of a pair of stringer tapes T having a series of spaced-apart interlocking fastener elements or scoops S clamped or otherwise attached to the opposed beaded edges thereof. It is the purpose of this machine to remove by cutting from the opposed edges of the tapes a series of adjacent fastener elements or scoops S at predetermined spaced-apart intervals therealong so as to provide a series of spaced-apart gap spaces G in the chain and to cut simultaneously another series of fastener elements from the tapes at another point in the chain so as to provide a needle gap NG at a spaced distance from each of said first gap spaces G, and finally to cut the tapes of the chain transversely thereof at the gap spaces G so as to provide individual fastener lengths F for application to the garment. After the fasteners have been applied to the desired garment sliders are assembled thereon so as to provide completed slide fasteners in a manner well known to those skilled in the art.

Now as to operation, it will be assumed that the machine is in readiness for operation with a reel of chain C positioned on the reel 137, as shown in FIG. 1 of the drawing. It will be seen that the chain C passes down around the roller 132, upwardly over the roller 136 and between the die 81 and cutting knife 60 and pressure pads 61 and past the locating member 73. The chain then passes upwardly partially around the upper side of feed wheel 8, between the same and the roller 13, outwardly partially around the roller 18, inwardly back between feed wheel 8 and the roller 14, and finally downwardly between the cut-off knife 23 and the anvil 50.

It will be understood that it is the purpose of the two rollers 13 and 14 to maintain the chain C in contact with the periphery of the feed wheel 8 as it passes therealong so that the chain is pulled through the machine from its source of supply at the reel 137. The amount of pressure these rolls 13 and 14 exert against the periphery of the feed wheel 8 is adjusted by means of the adjustment spring assembly 150.

It will also be understood that the roller 18 mounted on the end of the adjustable arm 19 is for the purpose of adjusting the length of fastener to be cut from the chain C and so as to assure that the cutting knife 23 cuts the chain at the proper place in the gap space G. This arm 19 together with the roller 18 carried thereby may be adjusted manually by the crank 141 and its associated mechanism.

The feed wheel 8 is rotated intermittently by the gear rack 106 through the action of gear 107 and the overrunning clutch 108 associated therewith. The distance of this intermittent rotation is controlled by the adjustable screw 101 which in turn is adjusted manually by means of the crank 117 for the desired fastener length which is later to be cut from the continuous length of chain C. In other words, this adjustment of the screw 101 determines at what point the fastener elements or scoops S will be severed and removed from the chain so as to provide the gap spaces G and NG.

It will also be assumed that all adjustments have been made to cut the desired fastener lengths from the chain and with the chain positioned in the machine as just described and, as shown in FIGS. 1 and 2 of the drawings. As the chain C passes upwardly between the die member 81 and the cutting knife 60 and past the locating member 73, it is momentarily at rest. At this time the slide member 21 is beginning to move to the left, as shown in these figures, by the yoke-like member 121 and the finger-like portion 75 of the locating member 73 enters between two adjacent fastener elements or scoops S, as shown in the broken lines of FIG. 14, so as to position properly the chain C relative to the die member 81 and the cutting knife 60 for the gap cutting operation. In continued movement of the slide member 21 to the left, the pressure pads 61 contact the fastener elements or scoops S forcing them against the face of the die member 81 so as to hold them securely in position thereagainst. Upon continued movement of the slide member 21 to the left, the cutting edges 60a and 60b of the cutting knife 60 in cooperation with the respective die openings 81c and 81d sever the fastener elements or scoops S substantially centrally of the length thereof and the cut portions H drop from the edges of the tapes, as more clearly shown in FIG. 17 of the drawings, so as to provide a gap space G and a needle gap space NG, as previously described.

Simultaneously with this gap spacing and the movement of the slide member 21 to the left, the cut-off knife 23 cooperates with the anvil 50 to cut the tapes T of the chain in a gap space G previously formed in the chain as just described so as to provide a fastener length F. It has been found that the gradual movement of the slide member 21 to the left, as shown and described, is in itself not sufficient for the cut-off knife 23 to cut cleanly and properly the tapes T. Accordingly, there is provided a trigger-like arrangement which applies a hammer-like blow to the cut-off knife 23 which will now be described more in detail.

Now attention is directed to FIGS. 10 and 11 of the drawings in which the trigger-like member 40 is shown in its normal position with the shoulder 47 of the end 46 thereof engaging the edge of the block 48. When the slide member 21 moves to the left the stud-like member 57 strikes the end of the plunger rod 45 which acts against the arm 44 of the trigger-like member 40 so as to release the same thereby permitting the member 30 to move forwardly or to the left as shown and in so doing it strikes the inner end of the cut-off knife 23 with a relatively sharp blow due to the action of the coil spring 34 so as to effectively cut both of the tapes T at the gap space.

When the slide member 21 has completed the gap spacing and fastener cutting operation as just described, it moves to the right as shown, to its retracted or normal position. In such movement it will be seen that the stud-like member 57 moves out of contact with the end of the rod 45 thereby permitting the trigger-like member 40 to again assume its normal position with the shoulder 47 thereof again engaging the edge of the block 48 due to the action of the spring loaded pin 42 in readiness for the next cut-off operation and cycle of the machine. This completes one cycle of operation of the machine and the cycle is repeated to cut the desired number of fastener lengths F from the continuous fastener chain C. It will be understood that the various mechanisms previously described are all in timed relation by any suitable means.

It will be seen that the cut fastener lengths F are delivered or dispensed from the machine, as more clearly shown in FIG. 2, ready for use and application to the garment or other article. It is the purpose of the coil springs 32 to hold the cutting edge of the cut-off knife 23 forcibly in contact with the tapes T until the knife slide or block 30 acts to strike the inner end of this cut-off knife 23.

It will also be seen that when the slide member 21 moves to the right the finger-like portion 75 of the locating member 73 is moved outwardly to its retracted position, as shown in FIG. 14, and out of engagement with the fastener elements or scoops S due to the cooperation of the portion 76 thereof with the portion 77 of the pressure pads 61 thereby permitting the fastener chain C to move freely along its path for the next gap spacing and cut-off operation. This locating member 73 is extremely important in that it positions the fastener elements or scoops S correctly in respect to the cutting edges 60a and 60b of the cutting knife 60 so as to assure that these cutting edges sever complete fastener elements or scoops and do not strike any of the fastener elements or scoops intermediate the width thereof whereby they might be hung up on the edges of the tapes which is objectionable for obvious reasons.

As a result of our invention, it will be seen that there is provided an improved and new machine with which there is incorporated means for forming simultaneously a conventional gap space and needle gap space in continuous slide fastener chain which effectively and efficiently removes completely the severed fastener elements or scoops from the edges of the tapes of the fastener chain and, at the same time, cuts automatically completed slide fasteners of the desired length therefrom. It will be seen that after the machine is set initially for the desired fastener lengths it needs little or no attention from an operator. It will also be understood that mechanism may be conveniently incorporated therewith for dispensing or cutting the exact number of fastener lengths desired.

While we have shown and described an embodiment which our invention may assume in practice, it will be understood that this embodiment is merely for the purpose of illustration and description, and that other forms may be devised within the scope of our invention as defined in the appended claims.

We claim:

1. In a machine for cutting slide fasteners of predetermined lengths from continuous fastener chain consisting of a pair of opposed tapes having a series of interlocked spaced-apart fastener elements attached to the opposed edges thereof, the combination of a single feed wheel arranged on a rotatable shaft for intermittent rotation and partially around which the fastener chain is disposed and passes as it is delivered into and through the machine, a rotatable shaft suitably mounted below said feed wheel and parallel to said first shaft, a gear arranged on said second shaft which cooperates with a bull gear suitably mounted adjacent thereto, a gear rack having one end thereof attached to adjustable eccentric means carried by said bull gear, an overrunning clutch mounted on said first shaft having a gear arranged therewith with which the opposite end of said gear rack cooperates to intermittently rotate said feed wheel, a slide member positioned below said feed wheel for reciprocation in a plane transversely of the axis of said rotatable shaft, a cutting punch mounted on said slide member adjacent one end thereof operable from one side of said chain, a stationary cutting die positioned directly opposite said cutting punch with which it is adapted to cooperate to sever and remove a series of adjacent fastener elements from the edges of the tapes of the chain as it is pulled therebetween by said feed wheel so as to provide a series of spaced-apart gap spaces in the chain, a cut-off knife mounted on said slide member adjacent the opposite end thereof and operable on the opposite side of said chain, and a stationary anvil with which said cutting knife cooperates to cut the tapes of the chain transversely thereof at the successive gap spaces along the chain so as to provide fasteners of a predetermined length as the chain is delivered from said feed wheel and between the cutting knife and said anvil, and means for driving said second shaft.

2. The combination as defined in claim 1, a trigger-like mechanism arranged on said slide member rearwardly of said cut-off knife for actuating the same relative to said slide member.

3. The combination as defined in claim 1, including an eccentric arranged on said second shaft, a yoke-like member disposed around said eccentric having means carried thereby engaging said slide member for reciprocating the same.

4. The combination as defined in claim 1, including another cutting punch and cooperating cutting die positioned adjacent said first cutting punch and die and operable therewith for severing and removing from the edges of the tapes of the chain a series of adjacent fastener elements so as to provide a series of needle gap spaces along the chain at spaced distances from the respective first gap spaces.

5. The combination as defined in claim 1, including a movably mounted roller operatively positioned to one side of said feed wheel around which the chain is looped as it passes from the feed wheel to the cut-off knife, means for adjusting the position of said roller relative to said feed wheel and said cutting knife for cutting the chain at the desired point in relation to the gap spaces therein to obtain the desired fastener lengths.

6. In a machine for cutting slide fasteners of predetermined lengths from continuous fastener chain consisting of a pair of opposed tapes having a series of interlocked fastener elements attached to the opposed edges thereof, the combination of a single feed wheel over and partially around which the fastener chain is disposed for feeding the fastener chain into and through the machine, means arranged below and at one side of the axis of said feed wheel and said chain and operable from one side thereof for cutting and removing a series of adjacent fastener elements from the edges of said tapes at predetermined spaced-apart intervals as the chain is moved therealong so as to provide a series of spaced-apart gap spaces therein, means for positioning the fastener chain relative to said cutting means so as to cut the desired number of fastener elements therefrom, tape cutting means mounted below said feed wheel at the opposite side of said axis and of said first cutting means and said chain and operable on the opposite side of said chain for cutting the tapes of the chain transversely thereof at the gap spaces as the chain passes therealong so as to provide a plurality of individual fastener lengths, and common means for actuating both said cutting means simultaneously.

7. In a machine for cutting slide fasteners of predetermined lengths from continuous fastener chain consisting of a pair of opposed tapes having a series of interlocked fastener elements attached to the opposed edges thereof, the combination of a single feed wheel over and partially around which the fastener chain is disposed for feeding the fastener chain into and through the machine, a cutting die mounted below and at one side of the axis of said feed wheel and said chain, a cutting punch mounted at the opposite side of said chain and operable from one side thereof directly opposite said die with which it cooperates for cutting and removing a series of adjacent fastener elements from the edges of said tapes at predetermined spaced-apart intervals as the chain is moved therealong so as to provide a series of spaced-apart gap spaces therein, means for positioning the fastener chain relative to said cutting die and punch so as to cut a predetermined number of fastener elements therefrom, a cut-off knife arranged below said feed wheel at the opposite side of the same operable from the opposite side of said axis and of said chain for cutting the tapes of the chain transversely thereof at each of said gap spaces as the chain passes therealong so as to provide a plurality of individual fastener lengths, and common means for actuating both said cutting punch and said cut-off knife simultaneously.

8. The combination as defined in claim 7, including means for adjusting the distance apart that the series of fastener elements are adapted to be cut and removed from the chain to provide the gap spaces and the length of the fasteners to be cut from the chain at the gap spaces.

9. The combination as defined in claim 7, including another cutting punch and cooperating cutting die positioned adjacent said first cutting punch and die and operable simultaneously therewith for severing and removing from the edges of the tapes of the chain a series of adjacent fastener elements so as to provide a series of needle gap spaces along the chain at spaced distances from the respective first gap spaces.

10. The combination as defined in claim 7, including a movably mounted roller operably positioned to one side of said feed wheel around which the chain is looped as it passes from the feed wheel to the cut-off knife, means for adjusting the position of said roller relative to said feed wheel and said cutting knife for cutting the chain at the desired point in relation to the gap spaces therein to obtain the desired fastener lengths.

11. The combination as defined in claim 7, including a shaft positioned below said slide member, means for driving said shaft, an eccentric mounted on said shaft responsive to the movement thereof, a yoke-like member disposed around said eccentric so as to be actuated thereby, a projecting portion carried by said yoke-like member which cooperates with means carried by said slide member for reciprocating the same.

12. In a machine for cutting slide fasteners of predetermined lengths from continuous fastener chain consisting of a pair of opposed tapes having a series of interlocked spaced-apart fastener elements attached to the opposed edges thereof, the combination of a single feed wheel arranged for intermittent rotation over and partially around which the fastener chain is disposed as it is delivered into and through the machine, a slide member arranged below said feed wheel for reciprocation in a plane transversely of the axis of said feed wheel, a cutting punch mounted on said slide member adjacent one end thereof to one side of said chain adjacent the delivery point and operable from one side of said chain, a stationary cutting die arranged directly opposite said cutting punch on the opposite side of the chain from said cutting punch with which it is adapted to cooperate to sever and remove a series of adjacent fastener elements from the edges of the tapes of the chain as it is pulled therebetween by said feed wheel so as to provide a series of spaced-apart gap spaces in the chain, a cut-off knife mounted on said slide member adjacent the opposite end thereof adjacent the point where the chain is delivered from said wheel to the side of the chain opposite that from said cutting punch and die and operable on the opposite side of said chain from said punch, a stationary anvil mounted directly opposite said cut-off knife with which the same cooperates to cut the tapes of the chain transversely thereof at the successive gap spaces therealong so as to provide fasteners of a predetermined length as the chain is delivered from said feed wheel and between the cutting knife and said anvil, and means for actuating said slide member.

13. In a machine for cutting slide fasteners of predetermined lengths from continuous fastener chain consisting of a pair of tapes having a series of interlocked spaced-apart fastener elements attached to the opposed edges thereof, the combination of a single feed wheel arranged for intermittent rotation over and partially around which the chain is disposed as it is fed into and through the machine thereby, a movable member arranged below said feed wheel for reciprocation in a plane transversely of the axis of said feed wheel, a first cutting means arranged at one end of said movable member and at one side of said chain and which is responsive to the movement of said movable member and operable from one side of said chain for removing a series of fastener elements from the edges of the tapes of the chain as it is delivered to said feed wheel, a second cutting means arranged below said feed wheel and to one side thereof at the opposite end of said movable member which is responsive to the movement of said movable member and which is operable on the opposite side of said chain as it is delivered from said feed wheel for cutting the tapes transversely at the successive gap spaces along the chain so as to provide individual fastener lengths, said fastener chain adapted to be delivered to said first cutting means at one side of said wheel and at one end of said movable member, and adapted to pass over and around said feed wheel and then delivered thereby to a said second cutting means at the other side of said wheel and the opposite end of said movable member, and means for actuating said movable member.

14. The combination as defined in claim 13, including means for adjusting the distance apart that the series of fastener elements are adapted to be cut and removed from the chain to provide the gap spaces and the length of the fasteners to be cut from the chain at the gap spaces.

15. The combination as defined in claim 13, including another cutting means positioned adjacent said first cutting means and operable simultaneously therewith for severing and removing from the edges of the tapes of the chain a series of adjacent fastener elements so as to provide a series of needle gap spaces along the chain at spaced distances from the respective first gap spaces.

16. The combination as defined in claim 13, including a movably mounted roller operably positioned to one side of said feed wheel around which the chain is looped as it passes from the feed wheel to the second cutting means, means for adjusting the position of said roller relative to said feed wheel and said second cutting means for cutting the chain at the desired point in relation to the gap spaces therein to obtain the desired fastener lengths.

17. The combination as defined in claim 13, including a shaft positioned below said movable reciprocating member, means for driving said shaft, an eccentric mounted on said shaft responsive to the movement thereof, a yoke-like member disposed around said eccentric so as to be actuated thereby, a projecting portion carried by said yoke-like member which cooperates with means carried by said movable member for reciprocating the same.

18. The combination as defined in claim 13, including a movably mounted finger-like member positioned adjacent said first cutting means which is adapted to enter the space between two adjacent fastener elements along the chain for locating and positioning the fastener elements to be cut relative to said cutting means as the chain passes therealong.

References Cited by the Examiner

UNITED STATES PATENTS

| 1,864,488 | 6/32 | Gaisman | 83—587 |
| 2,127,131 | 8/38 | Moeller | 83—696 XR |
| 2,752,997 | 7/56 | Soave | 83—921 |
| 2,817,403 | 12/57 | Feitl | 83—921 |
| 2,838,112 | 6/58 | Feitl | 83—921 |

FOREIGN PATENTS 538,035   7/59   Belgium.

ANDREW R. JUHASZ, *Primary Examiner*.

CARL W. TOMLIN, *Examiner*.